Patented Jan. 22, 1946

2,393,321

UNITED STATES PATENT OFFICE 2,393,321

CURED POLYMERS

Joseph P. Haworth, Westfield, N. J., assignor, by mesne assignments, to Jasco, Incorporated, a corporation of Louisiana No Drawing. Application January 14, 1942, Serial No. 426,715

18 Claims. (Cl. 260—93)

This application relates to rubbery synthetic polymers; relates particularly to the curing of low unsaturation, linear polymers such as the isoolefinic, low temperature polymeric materials; and relates especially to a non-sulfur, curing process; and product for the linear polymer, of the type of low temperature, isoolefinic polymers and interpolymers.

A series of linear olefinic polymers and interpolymers have been prepared, especially polymers of isobutylene, which have properties much like those of crude rubber, including elasticity, plasticity, cold flow, and various other rubbery characteristics. To the present, however, the simple polymer of isobutylene has not been cured by any known procedure into material having characteristics like those of vulcanized rubber; and the series of interpolymers of an isoolefin, such as isobutylene, with such diolefins as butadiene, isoprene, piperylene, dimethyl butadiene and the like do not vulcanize in the same way in which rubber vulcanizes, and are cured with elemental sulfur only with considerable difficulty.

The present invention is based upon the discovery that the simple polyolefins, polyisoolefins, and the series of isoolefinic polymers with diolefins will cure rapidly, easily, efficiently and at a relatively very low temperature by a new and previously unknown inter-action between these synthetic polymers and a quinonoid substance of the benzene or naphthalene series, to yield a very valuable cured polymeric body.

The preferred linear polymers are those produced by a low temperature reaction with an active metal halide, or Friedel-Crafts type catalyst applied to a predominantly isoolefinic material, such as isobutylene, with or without a second olefinic interpolymerizable component at a relatively very low temperature, preferably ranging from —10° C. to —103° C. or even lower, to a temperature as low as —150° C. The polymer of isobutylene alone does not cure with any previously used curing agent; the interpolymers of an isoolefin, such as isobutylene with a diolefin, such as butadiene, isoprene, piperylene, dimethyl butadiene and the like, are reactive with sulfur, but the reaction proceeds very slowly when sulfur alone, or sulfur and ordinary rubber vulcanization agents are used and the necessary heating to cause it to proceed at all tends to reduce the molecular weight of the polymers by an undesirable amount. It has previously been considered necessary to use a limited class of ultra-accelerators such as tetramethyl thiuram disulfide in order to obtain rubber-like bodies having tensile strengths, when cured, ranging from 500 to 4500 or 4800 pounds per square inch or even higher, with elongations at break ranging from 500% to 1200% or higher, and very high abrasion resistance and flexure resistance, as well as very high chemical resistance, especially to oxidation.

The curing reaction, when it does occur, seems to be different in many ways from the vulcanization reaction which occurs between natural rubber and sulfur, especially in view of the fact that the ordinary vulcanization accelerators used in the vulcanization of rubber are substantially without effect upon the sulfurization of this polymer. A very limited number of what are called ultra-accelerators are found to show a limited amount of sulfurization aid with this synthetic polymer, but none of them will cure the polymer with sulfur at any such speed as is obtainable with natural rubber. It may be noted that these polymers are quite highly saturated chemically, and relatively inert, whereas, natural rubber is highly unsaturated, and thereby extremely reactive. Likewise, difficulty has been experienced in obtaining a low heat build-up in the cured polymer, the polymer when cured with sulfur tending to show an undesirably high rate of heat build-up under rapidly varying dynamic stresses.

The present invention is based upon the unexpected discovery that these polymers, in spite of their relatively very low rate of reaction with elemental sulfur, and the relatively slight increase in rate of sulfurization with even the best of the sulfurization aiding compounds, show the unexpected property of curing with compounds containing an ortho- or paraquinonoid nucleus of the benzene or naphthalene series, or with compounds capable of forming an ortho- or paraquinonoid nucleus of the benzene or naphthalene series in the presence of an oxidizing agent. Of particular interest in this reaction is the class of compounds listed under the general classification of quinone imines; and more particularly, quinone diimines.

A particularly useful example of this type of compound is para-quinone dioxime, which in conjunction with lead dioxide, yields a curing reaction which is comparable in speed to the vulcanization rate obtainable with rubber and the ultra-accelerator vulcanization aids. There is also obtained in combination with the speed of curing, the outstandingly valuable property of a very marked reduction in the rate of heat build-up under conditions of rapidly varying stresses.

Thus the invention is found in a composition of matter consisting of an isoolefinic polymer, interpolymer with a diolefin in admixture with a quinonoid substance. The quinonoid substance is defined broadly as (1) containing, or capable of forming on oxidation, an ortho- or para-quinonoid nucleus of the benzene or naphthalene series. When the quinonoid substance contains the quinonoid nucleus directly it is preferably, but not necessarily, used in the presence of an oxidizing agent such as a higher metallic oxide. When the quinonoid substance is merely one capable of forming, on oxidation, an ortho- or para-quinonoid nucleus, it necessarily is used in the presence of an oxidizing agent such as a higher metallic oxide. To this mixture of polymer and quinonoid substance there are desirably added such additional modifiers as carbon black, zinc oxide and stearic acid for the sake of the minor improvement obtainable thereby, the resulting compound yielding cured rubbery substances having tensile strengths ranging from 500 to 4500 or 4800 pounds per square inch or even higher, with elongations at break ranging from 1000% to 100% or even lower, together with phenomenally high abrasion resistance, phenomenally high flexure resistance, a desirably low rate of heat build-up in the material under rapidly varying stresses, and a very rapid rate of cure. Other objects and details of the invention will be apparent from the following description.

In practicing the invention, broadly, the polymer, whether the simple polymer or the interpolymer of isobutylene, with a diolefin, is compounded, preferably on the roll mill, with a suitable substance containing, or capable of developing, an ortho- or para-quinonoid nucleus, such for instance as paraquinone dioxime. The quinonoid substance is preferably present in the proportion of from 0.2 parts to 10 parts per 100 parts of polymer, and the oxidation agent which may conveniently be lead dioxide, may be added in the range of from 0 to 25 parts per 100 parts of polymer. These proportions are applicable both to the simple polymer of isobutylene and to the interpolymer of isobutylene with a diolefin. The compound may in addition be mixed with carbon black in the range of from 0 to 200 parts per 100 parts of polymer, with zinc oxide in the range of from 1 part to 50 parts per 100 parts of polymer, and with stearic acid in the range of from 1 part to 10 parts per 100 parts of polymer.

These compounding agents and ranges, as indicated, are preferred but other compounding agents and wider ranges of proportions outside of the indicated limits, are particularly useful for various special applications. The resulting compound is then formed into the desired shape, which may include calendering onto fabric or extruding into tubes or treads or other rubber articles or molding into appropriate shapes; and then cured at temperatures ranging preferably from 100° C. to 150° C. (although curing may occur at temperatures within the range of +20° C. to +200° C.) for a time interval ranging from 5 to 60 minutes (for the preferred temperature range, the wider temperature range requiring wider time limits) to yield a cured rubber-like article having the above mentioned high tensile strength, high elongation, high abrasion resistance, high flexure resistance and low heat build-up properties.

The carbon black and the other compounding agents indicated are useful for various characteristics, both with the simple polymer of isobutylene and the interpolymer of isobutylene with a diolefin as indicated, but they are not necessary, since thoroughly cured "pure gum" compounds are obtainable with formulae containing only the polymer and the quinonoid nucleus compound. Alternatively, many other fillers and pigments are useful, including lead chromate, ferric oxide, mercuric oxide, zinc oxide, magnesia, lithopone, bayrites, iron oxide, aluminum oxide, clay, wood flour, asbestos and many other pigments, fillers and colorants; (the latter including especially the oil-soluble dyes).

The polymer to which the invention is applied is conveniently prepared from an isoolefin, preferably isobutylene, alone or with a diolefin, such as butadiene or isoprene or piperylene or dimethyl butadiene or other similar diolefin, the olefinic material being cooled to temperatures ranging from about −10° C. and preferably from −78° C. to −103° C. or even as low as −150° C. The mixture may be cooled to these temperatures by the direct addition of solid carbon dioxide or liquid ethylene or liquid ethane or methane or other appropriate inert refrigerant; in some instances even liquid nitrogen being useful, especially in admixture with other substances.

To this cooled olefinic material, there is then added a catalyst such as boron trifluoride (especially for isobutylene alone) or a dissolved active halide catalyst, such as aluminum chloride or aluminum bromide or titanium tetrachloride or uranium tetrachloride or other similar active halide, in solution, in an inert, low freezing solvent, such as ethyl or methyl chloride or bromide or carbon disulfide or ethylene dichloride or chloroform, or propyl chloride or other similar solvent. The catalyst solution, preferably cooled to a temperature of −78° C. or lower, is then added to the olefinic mixture, conveniently in the form of a fine spray applied to the surface of the rapidly stirred olefinic mixture. The reaction proceeds rapidly and in from 1 to 15 minutes, yields the desired polymer.

When the simple polymer of isobutylene is made, the reaction is preferably carried substantially to completion, to yield the desired rubbery polymer which is recoverable from the reaction vessel in the form of masses of a snow-white, solid substance.

When the interpolymer of isobutylene with a diolefin is prepared, the polymerization reaction is preferably stopped short of complete polymerization of all of the olefinic material, especially when the diolefin is butadiene. When the reaction has reached the desired stage, it may be arrested by such procedures as stopping delivery of the catalyst spray or by discharging the cooled mixture into water or aqueous solutions of alkali or even into slurries of alkaline material, such as lime; or into warm naphtha which may contain ammonia or alkaline compounds; or the reaction may be arrested by adding to it a small amount of an alcoholic material, which is preferably isopropyl alcohol, or which alternatively may be ethyl, methyl or butyl alcohol or may be ethylene glycol or glycerine or other similar mono hydroxy or poly-hydroxy compound.

The polymer is then brought up to room temperature and is ready for further processing. The polymer, as so prepared, is in appearance a snowy white solid which may have a relatively fine grain or may be in lumps or nodules according to the method of separation from the reacted materials. It is characterized by a molecular weight within the range beginning at 15,000 to 20,000 and extending to a top range of 80,000 to 150,000, although by special precautions, molecular weights as high as 250,000 to 500,000 can be obtained. It is characterized by an iodine number ranging from a small fraction of 1 up to about 50, the preferred iodine number being in the range of 0.5 to 5 or 6, especially for the interpolymer. The solid polymer is relatively readily soluble in substantially all of the hydrocarbon solvents and chlorinated hydrocarbon solvents. It is substantially wholly insoluble in oxygenated solvents generally; and wholly insoluble in aqueous liquids of all sorts. It is readily reactive with elemental chlorine and very slightly reactive with oxygen. It is substantially non-reactive with all of the acids, alkalis and salts and is reactive with only a very limited number of organic substances.

EXAMPLE 1

In practicing the invention, the polymer as above prepared may be compounded on the mill in a manner closely similar to the procedure utilized for natural rubber, the subjoined compounding formula being a desirable one.

This formula utilizes the simple polyisobutylene, known in the trade as Vistanex (polybutene). This polymer is almost completely saturated having an iodine number of about 0.09. It cannot be cured in any of the conventional curing processes by reaction with elemental sulfur or organic sulfur compounds or both. It is reactive with sulfur chloride under drastic conditions to yield a modified type of material which, like factice, has little tensile strength and is readily crumbled between the fingers.

|  | Formula | |
|---|---|---|
|  | No. 1 | No. 2 |
| Polybutene | 100.0 | 100.0 |
| Channel black | 50.0 | 50.0 |
| Zinc oxide | 5.0 | 5.0 |
| Stearic acid | 3.0 | 3.0 |
| Para-quinone-dioxime | 1.0 |  |
| $PbO_2$ | 3.0 |  |

In preparing this composition, the polymer is placed upon the roll mill and worked briefly, usually for about two to ten minutes, until it has formed a band around the rolls. The carbon black, zinc oxide and stearic acid are then added, the mill being preferably maintained at a temperature below about 70° C. until the mixture is homogeneous. The lead dioxide and para-quinone-dioxime are added rapidly and milled into the compound, obtaining a homogeneous mixture in the shortest possible time. This mixture may then be shaped in any desired fashion, such as by placing in molds, by extrusion, or calendering or sheeting out or other treatment. It is then cured at a temperature of approximately 240° F. for a time interval of approximately 30 minutes, to yield a well cured, highly elastic material having a high tensile strength, high abrasion resistance, high flexure resistance and low heat build-up.

The above Formula No. 1 includes the quinonoid nucleus curing agent, whereas Formula No. 2 omits this agent. This polyisobutylene had a molecular weight of approximately 100,000. Upon test, after the heating treatment, this polymer showed the following characteristics:

|  |  | No. 1 | No. 2 |
|---|---|---|---|
| Tensile strength | lbs./sq. in. | 1,350 | 725 |
| Elongation | per cent | 1,120 | 1,200 |
| Permanent set at break | do | 95 | 210 |

Comparison of the characteristics of these two materials after heating showed a different and higher nerve and tightness in compound No. 1, which showed conclusively that an actual curing reaction had occurred.

The material of Formula No. 2 showed no different characteristics after heating from those which it showed before heating and the characteristics of the compounded material of Formula No. 2 were very slightly different from those of the uncompounded pure gum material and were only those incidental to the addition of the carbon black and the small quantities of zinc oxide and stearic acid. In sharp contrast, the material of Formula No. 1 showed little difference between the unheated compounded material over the uncompounded material, yet showed profound differences in the heated, cured material over the material as compounded on the rolls.

Thus, the quinonoid nucleus substance in the form of para-quinone-dioxime shows the new, unexpected and previously unknown property of curing simple polyisobutylene.

EXAMPLE 2

This unique curing action is enhanced and facilitated by the presence of small quantities of diolefinic interpolymerizates. These interpolymers are linear chain, low iodine number, high molecular weight polymers which are predominantly isoolefinic in constitution. The interpolymer is prepared preferably containing only from ½% to 10% of the diolefin, the balance, from 99½% to 90% being polymerized isobutylene.

A desirable formula for the compounding of the interpolymer is shown in the subjoined formula:

Formula No. 3

| Isoolefin-diolefin polymer | 100.0 |
|---|---|
| Carbon black | 60.0 |
| Zinc oxide | 5.0 |
| Stearic acid | 3.0 |
| Para-quinone-dioxime | 1.0 |
| Lead dioxide | 3.0 |

For comparative purposes, the polymer was compounded with a common and widely used vulcanizer for rubber according to the following formula, No. 4:

Formula No. 4

| Isoolefin-diolefin polymer | 100.0 |
|---|---|
| Carbon black | 60.0 |
| Zinc oxide | 5.0 |
| Stearic acid | 3.0 |
| Captax (mercaptobenzothiazole) | 1.0 |
| Sulfur | 1.5 |

Also the natural rubber was compounded both with the same commonly used vulcanization accelerator and with the para-quinone-dioxime as shown in formulae Nos. 5 and 6.

|  | No. 5 | No. 6 |
|---|---|---|
| Smoked sheet | 100.0 | 100.0 |
| Carbon black | 50.0 | 50.0 |
| Zinc oxide | 5.0 | 5.0 |
| Stearic acid | 5.0 | 5.0 |
| Isopropoxydiphenylamine plus diphenyl-p-phenylene diamine | 1.0 | 1.0 |
| Para-quinone-dioxime |  | 1.0 |
| $PbO_2$ |  | 3.0 |
| Mercaptobenzothiazole | 1.0 |  |
| Sulfur | 3.0 |  |

These formulae were compounded in the same manner as described in Example 1.

Tests on these various compounds after curing as indicated, showed the following characteristics:

| Compound | Cure | Tensile | Elongation |
|---|---|---|---|
| No. 3 | 15' @ 240° F | 1,595 | 770 |
|  | 30' | 1,930 | 690 |
|  | 50' | 1,920 | 630 |
| No. 4 | No cure in 2 hrs. at 307° F |  |  |
| No. 5 | 20' @ 307° F | 4,000 | 530 |
|  | 40' | 4,090 | 540 |
|  | 60' | 3,710 | 500 |
|  | 80' | 3,710 | 500 |
| No. 6 | 15' @ 240° F | 2,280 | 460 |
|  | 30' | 2,770 | 480 |
|  | 50' | 2,210 | 430 |

These results show that Captax (mercaptobenzothiazole) does not cause a cure of the polymer within any reasonable length of time, but that the cure obtained with the para-quinone-dioxime in the polymer is closely comparable with the cure obtained with para-quinone-dioxime in natural rubber, similarly compounded.

EXAMPLE 3

Another series of tests on comparable formulae showed still other interesting results. Two separate compounds were prepared according to the subjoined Formulae 7 and 8:

|  | No. 7 | No. 8 |
|---|---|---|
| Isoolefin-diolefin polymer | 100.0 | 100.0 |
| Zinc oxide | 5.0 | 2.0 |
| Stearic acid | 1.5 | 5.0 |
| Carbon black | 60.0 | 60.0 |
| Tuads (tetra methyl thiuram disulfide) | 1.0 |  |
| Sulfur | 1.5 |  |
| Para-quinone-dioxime |  | 2.0 |
| PbO$_2$ |  | 7.0 |

These compounds were prepared on the roll mill as above described. The compounds were then placed in molds and cured as shown in the subjoined table whereafter the tensile strength, the modulus at 200% elongation and the elongation at break were determined as shown in the subjoined table:

| Formula | Cure | Tensile | Mod. @ 200% | Elongation |
|---|---|---|---|---|
| No. 7 | No cure in 90' @ 240° F |  |  |  |
|  | 30' @ 307° F | 2,010 | 121 | 940 |
|  | 60' | 2,040 | 131 | 850 |
|  | 90' | 2,100 | 130 | 870 |
| No. 8 | 5' @ 240° F | 1,910 | 593 | 520 |
|  | 10' | 1,740 | 843 | 360 |
|  | 20' | 2,110 | 993 | 380 |
|  | 40' | 2,010 | 1,000 | 360 |

In these formulae a satisfactory curing with Tuads is obtainable at 307° F. over time intervals ranging from 30 to 90 minutes. However this formula does not cure at 240° F. in any time as short as 90 minutes, this being 2½ times the curing time for the para-quinone-dioxime to obtain an excellent cure.

It may be noted that these tensile strengths are fully adequate for substantially all service to which rubber is commonly put. It may be noted that, especially for tire service, tensile strengths in cured rubber-like materials, have relatively little significance and that while these tensile strengths are not the maximum which can be obtained with natural rubber or the polymer, either by curing with sulfur or by other sulfurizing agents, materials having these tensile strengths are highly satisfactory for the majority of the uses to which cured rubber-like substances are put, especially pneumatic tires, rubber motor mountings, aeroplanes vibration damping and mounting devices and the like.

Samples of these formulae were tested for abrasion resistance and the following results were obtained:

[Abrasion resistance—du Pont Abrader]

| Formula | Cure | Cc. loss/H. P./hr. |
|---|---|---|
| No. 7 | 30' @ 307° F | 453 |
|  | 60' | 573 |
| No. 8 | 30' @ 240° F | 320 |
|  | 60' | 273 |

(The lower figure, showing a lower amount of material removed per horse-power hour, shows the higher abrasion resistance.)

These results clearly show a much greater resistance to abrasion in the polymer material cured with the quinonoid substance over the same polymer cured with sulfur and an ultra-accelerator.

Further samples of these materials were tested for rebound and the following results were obtained:

| Formula | Cure | Rebound |
|---|---|---|
|  |  | Per cent |
| No. 7 | 80' @ 307° F | 25.7 |
| No. 8 | 45' @ 240° F | 33.8 |

These results show a very substantial increase in rebound in the polymer cured with the quinonoid nucleus substance as contrasted to the same polymer cured with sulfur and an ultra-accelerator indicating a markedly higher modulus and markedly reduced energy loss in the cured polymer under stresses.

Similar tests made for heat build-up show the comparative results in the subjoined table:

| Formula | Cure | Shore hardness | Static compression | Dynamic initial | Compression final | Max. temp. | Time to max. temp. |
|---|---|---|---|---|---|---|---|
|  |  |  | Inches | Inches | Inches | °C. | Minutes |
| No. 7 | 30' @ 307° F | 45 | 0.459 | 0.511 | 0.599 | 139.8 | 6 |
|  | 60' | 48 | 0.503 | 0.445 | 0.570 | 132.7 | 12 |
| No. 8 | 30' @ 240° F | 57 | 0.274 | 0.215 | 0.380 | 118.2 | [1] 32 |
|  | 60' | 59 | 0.261 | 0.243 | 0.425 | 110.9 | [1] 36 |

[1] Test discontinued.

Conditions of test

Oven temperature _____°C.___ 100
Speed _____R. P. M.___ 1800
Stroke _____inches___ 0.125
Load _____lbs./sq. in.___ 148

The polymers cured as above disclosed, particularly in Formula No. 8 are especially valuable for tire treads.

Not only does this curing agent show a very marked reduction in rate of heat build-up, but it permits of a highly valuable control of the modulus. That is, by a variation in the amount of the curing agent added, a highly valuable variation and adjustment of the modulus can be obtained as is well shown in the following table:

Formula No. 8 with various proportions of curing agent.

*Modulus @ 200% elongation*

|  | Lbs./sq. in. |
|---|---|
| 1 part p-quinone dioxime+3.5 PbO₂ | 225 |
| 2 parts p-quinone dioxime+7 PbO₂ | 1,000 |
| 3 parts p-quinone dioxime+10.5 PbO₂ | 1,800 |

(Parts of p-quinone dioxime per 100 of polymer)

From this it will be observed that the modulus rises very rapidly with an increase in the amount of curing agent present; a multiplication of the amount of curing agent by 3, increasing the modulus by more than 7 times.

These results show that the isobutylene type polymers which in the past have proven to be strongly resistant to sulfur, with or without the ordinary rubber vulcanization accelerating agents generally, cure by the process of the invention in a surprisingly easy, smooth, simple and satisfactory fashion and in addition, the cured material shows the unexpected and very valuable property of a sharp reduction in the rate of heat build-up, together with a marked increase in abrasion resistance.

This combination of properties is of extreme value for those uses in which the polymer is subjected to rapidly varying stresses, particularly in automobile tires since the tires so cured, run much cooler and will withstand heavy duty service under conditions of high temperature much better than the same polymer cured with other curing agents, because of the new and very useful combination, in tires made of this particular polymer, cf phenomenally high abrasion resistance, flexure resistance, and resistance to oxidation by atmospheric oxygen; and the new and very valuable property of low heat build-up obtainable by the present curing agent. By virtue of this combination of factors, tires so prepared will give a length of service which is different in order of magnitude from service obtainable from tires made of the same polymer cured with sulfur and sulfurization aids. This service is particularly valuable for heavy duty trucking on concrete roads in hot summer weather, and is outstandingly valuable for military service in staff cars, trucks and tanks in desert warfare, since the high abrasion resistance withstands the sand, and the low heat build-up avoids the heating of the tires to destructive temperatures which otherwise occurs in desert service.

The above examples utilize a mixture of paraquinone-dioxime and lead dioxide as the curing agent. The invention, however, is not limited to these materials alone but is found broadly in the curing of an isoolefinic type of polymer by the combination therewith of substances containing an ortho- or para-quinonoid nucleus of the benzine or naphthalene series or compounds capable of forming such nucleus in the presence of an oxidizing agent. The invention is applicable to the simple isoolefinic polymers which have never been cured before, and to polymers which are predominantly isoolefinic in composition.

As above pointed out the essence of the present invention is the use in combination with an isoolefinic polymer, of a substance as a curing agent, this substance either containing or being capable of forming on oxidation an ortho- or paraquinonoid nucleus of the benzene or naphthalene series. Thus a preferred class of the curing agent is a diimine compound containing the structure:

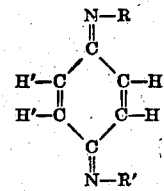

in which R and R' are any desired substituents alike or different, including hydrogen, hydroxy, the halogen, mercaptan groups, phenyl, alkyl, aryl aralkyl, cyclic radicals generally, aliphatic radicals generally, metallic salts generally, ethers and thioethers and in fact substantially any substituent radical having a single bond which can be coupled to nitrogen, and H' is hydrogen, or a second ring structure.

Alternatively, the naphtho-quinones have the formula:

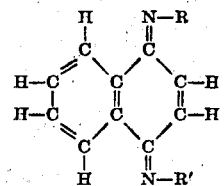

and are similarly usable, R and R' being any desired substituent as above pointed out.

Representative substances meeting the requirements of this definition are:

*2-amino-4-nitrophenol
Quinone
1,4-naphthoquinone
*p-aminophenol
Tetrachlorquinone
Tetrabromquinone
p-Diphenoquinone-bis-chlorimine
p-Quinone-N-cyclohexylimine
*N-phenyl-p-amino-phenol
p-quinone-phenylaminophenyl-imine
p-quinone-monophenyl-di-imine
p-quinone-4-amino-1-naphthyl-di-imine
p-quinone-azine
p-quinone-p-dimethyl-aminophenyl-di-imine
p-phenylene-bis-p-quinone
p-quinone-azine-N-phenyl-diimine
p-quinone-azine-bis alphanaphthylimine
p-quinone-dioxime dimethyl ether
p-quinone-p-hydroxyphenylimine-orime
*p-phenylene diamine
*p-hydroxy-azobenze
*p-nitroso-monomethylaniline
*p-methyl-amiophenol
*p-amino-diphenylamine
*Aniline
*Alpha-naphthylamine
*Acetanilide
*Diphenylurea
*Meso-dimethyl acridane
2,6-dichloro-p-quinone-4 mono-chlorimine
p-quinone-N-ethylimine
p-phenylene-bis-p-quinonimine
p-phenylene-bis-p-quinonimine-anil
o-quinone dioxime
p-quinone monoxime
Zinc salt of p-quinone dioxime
p-quinone bis phenylimine
*2, 4, 6, 2', 4', 6'-hexachloro-diazoaminobenzene
*p, p'-di-p-toluene-sulfonyl p-phenylenediamine
*p-methylamino-azo-benzene In the above list those compounds which are marked with an asterisk must be used with an oxidizing agent in order to develop the quinonoid structure. Those not marked may be used alone or with an oxidizing agent as desired.

These substances are representative only and substantially all of them may have still other substituents without departure from the inventive concept. Many of them may be used alone, especially those which already contain the quinonoid nucleus. All of them may be used with an oxidizing agent such as lead oxide and a limited number must be used with an oxidizing agent. Suitable inorganic oxidizing agents are:

$PbO_2$—lead dioxide
$Fe_2O_3$—ferric oxide
$Fe_3O_4$—iron oxide magnetite
$PbC_2O_4$—lead chromate
$K_2C_2O_7$—potassium dichromate
$KMnO_4$—potassium permanganate
$MnO_2$—manganese dioxide
$Pb_3O_4$—red lead
$ZnO_2$—zinc oxide
$BaO_2$—barium peroxide.

Organic oxidizing agents are also useable, such substances as benzoyl peroxide, the nitro benzenes in general, the nitro phenols in general, and the tertiary amine oxides being particularly useful for this purpose.

The preferred form of the invention is above described as applied to a low temperature, isoolefinic linear polymer of low unsaturation. The invention is however broader than is indicated by the above examples, and is applicable to linear polymers of low unsaturation generally, whether isoolefinic or not, and whether low temperature or not. The basic factor or requirement of the invention is the combination, for the production of a cure, of any linear polymer of low unsaturation having a molecular weight within the range of about 15,000 to about 500,000, an iodine number within the range of a small fraction of 1, to about 50, the lower limit being approximately 0.001, and a rubbery character; that is, a relatively high elongation, about at least 50% before separation under tension.

Thus the invention consists in the process of curing a linear olefinic or isoolefinic polymer, preferably an isobutylenic polymer with or without a copolymerizate in minor proportion, by the application thereto of a material containing or capable of forming a quinonoid nucleus of the benzene or naphthalene series, together with the product obtainable therewith.

While there are above disclosed but a limited number of embodiments of the invention, it is possible to produce still other embodiments without departing from the inventive concept hereinabove disclosed, and it is therefore desired that only such limitations be imposed upon the appended claims as are stated therein or required by the prior art.

The invention claimed is:

1. A composition of matter comprising a linear chain olefinic polymer characterized by a molecular weight within the range of 15,000 to 500,000 and an iodine number within the range of 0.001 and 50 in combination with a curing agent comprising a substance containing a quinonoid nucleus.

2. A composition of matter comprising an isoolefinic polymer characterized by a molecular weight within the range of 15,000 to 500,000 and an iodine number within the range of 0.001 and 50 in combination with a curing agent comprising a substance containing a quinonoid nucleus.

3. A composition of matter comprising an olefinic linear chain polymer characterized by a molecular weight within the range of 15,000 to 500,000 and an iodine number within the range of 0.001 and 50 in combination with a mixture of a substance capable of producing a quinonoid nucleus upon oxidation; and an oxidizing agent.

4. A composition of matter comprising a linear isoolefin-diolefin polymer characterized by a molecular weight within the range of 15,000 to 500,000 and an iodine number within the range of 0.001 and 50 in combination with a mixture of lead dioxide and para-quinone dioxime.

5. A cured rubber-like body comprising an interpolymer of isobutylene with a diolefin characterized by a molecular weight within the range of 15,000 to 500,000 and an iodine number within the range of 0.001 and 50 in chemical combination with a mixture of lead dioxide and para-quinone-dioxime.

6. A composition of matter comprising an olefinic linear polymer characterized by a molecular weight within the range of 15,000 to 500,000 and an iodine number within the range of 0.001 and 50 in combination with a quinone di-imine.

7. A composition of matter comprising an olefinic linear polymer characterized by a molecular weight within the range of 15,000 to 500,000 and an iodine number within the range of 0.001 and 50 in combination with a substituted quinone di-imine.

8. A composition of matter comprising a linear chain olefinic polymer prepared from an isobutylene characterized by a molecular weight within the range of 15,000 to 500,000 and an iodine number within the range of 0.001 and 50 in combination with a curing agent comprising a substance containing a quinonoid nucleus.

9. A composition of matter comprising a linear chain olefinic polymer prepared from isobutylene and a conjugated diolefin characterized by a molecular weight within the range of 15,000 to 500,000 and an iodine number within the range of 0.001 and 50 in combination with a curing agent comprising a substance containing a quinonoid nucleus.

10. A composition of matter comprising a linear chain olefinic polymer prepared from isobutylene and a conjugated diolefin having 4 to 6 inclusive carbon atoms per molecule characterized by a molecular weight within the range of 15,000 to 500,000 and an iodine number within the range of 0.001 and 50 in combination with a curing agent comprising a substance containing a quinonoid nucleus.

11. A composition of matter comprising a linear chain olefinic polymer prepared from isobutylene and butadiene characterized by a molecular weight within the range of 15,000 to 500,000 and an iodine number within the range of 0.001 and 50 in combination with a curing agent comprising a substance containing a quinonoid nucleus.

12. A composition of matter comprising a linear chain olefinic polymer prepared from isobutylene and isoprene characterized by a molecular weight within the range of 15,000 to 500,000 and an iodine number within the range of 0.001 and 50 in combination with a curing agent comprising a substance containing a quinonoid nucleus.

13. A composition of matter comprising a linear chain olefinic polymer prepared from isobutylene and a 5-carbon-atom conjugated diolefin characterized by a molecular weight within the range of 15,000 to 500,000 and an iodine number within the range of 0.001 and 50 in combination with a curing agent comprising a substance containing a quinonoid nucleus.

14. A composition of matter comprising a linear chain olefinic polymer prepared from isobutylene and dimethyl butadiene characterized by a molecular weight within the range of 15,000 to 500,000 and an iodine number within the range of 0.001 and 50 in combination with a curing agent comprising a substance containing a quinonoid nucleus.

15. A composition of matter comprising a linear chain olefinic ploymer characterized by a molecular weight within the range of 15,000 to 500,000 and an iodine number within the range of 0.001 and 50 in combination with a curing agent comprising a substance containing a compound of the benzene series having an ortho-quinonoid nucleus.

16. A composition of matter comprising a linear chain olefinic polymer characterized by a molecular weight within the range of 15,000 to 500,000 and an iodine number within the range of 0.001 and 50 in combination with a curing agent comprising a substance containing a compound of the benzene series having a para-quinonoid nucleus.

17. A composition of matter comprising a linear chain olefinic polymer characterized by a molecular weight within the range of 15,000 to 500,000 and an iodine number within the range of 0.001 and 50 in combination with a curing agent comprising a substance containing a compound of the naphthalene series having an ortho-quinonoid nucleus.

18. A composition of matter comprising a linear chain olefinic polymer characterized by a molecular weight within the range of 15,000 to 500,000 and an iodine number within the range of 0.001 and 50 in combination with a curing agent comprising a substance containing a compound of the naphthalene series having a para-quinonoid nucleus.

JOSEPH P. HAWORTH.

Disclaimer 2,393,321.—*Joseph P. Haworth*, Westfield, N. J. CURED POLYMERS. Patent dated Jan. 22, 1946. Disclaimer filed Sept. 21, 1949, by the assignee, *Jasco, Incorporated*.

Hereby disclaims from the scope of protection in said patent, all polymers having an iodine number below 0.5 from both specification and claims, and hereby disclaims claims 1, 2, 3, 6, 7, 8, 15, 16, 17, and 18 of said patent; these numbered claims not being limited to a copolymer, and, therefore, not necessarily limited to copolymers having an iodine number greater than 0.5.

[*Official Gazette October 25, 1949.*]